No. 704,767.
E. G. STEINMETZ.
SECONDARY BATTERY.
(Application filed Sept. 29, 1900.)
Patented July 15, 1902.
(No Model.)
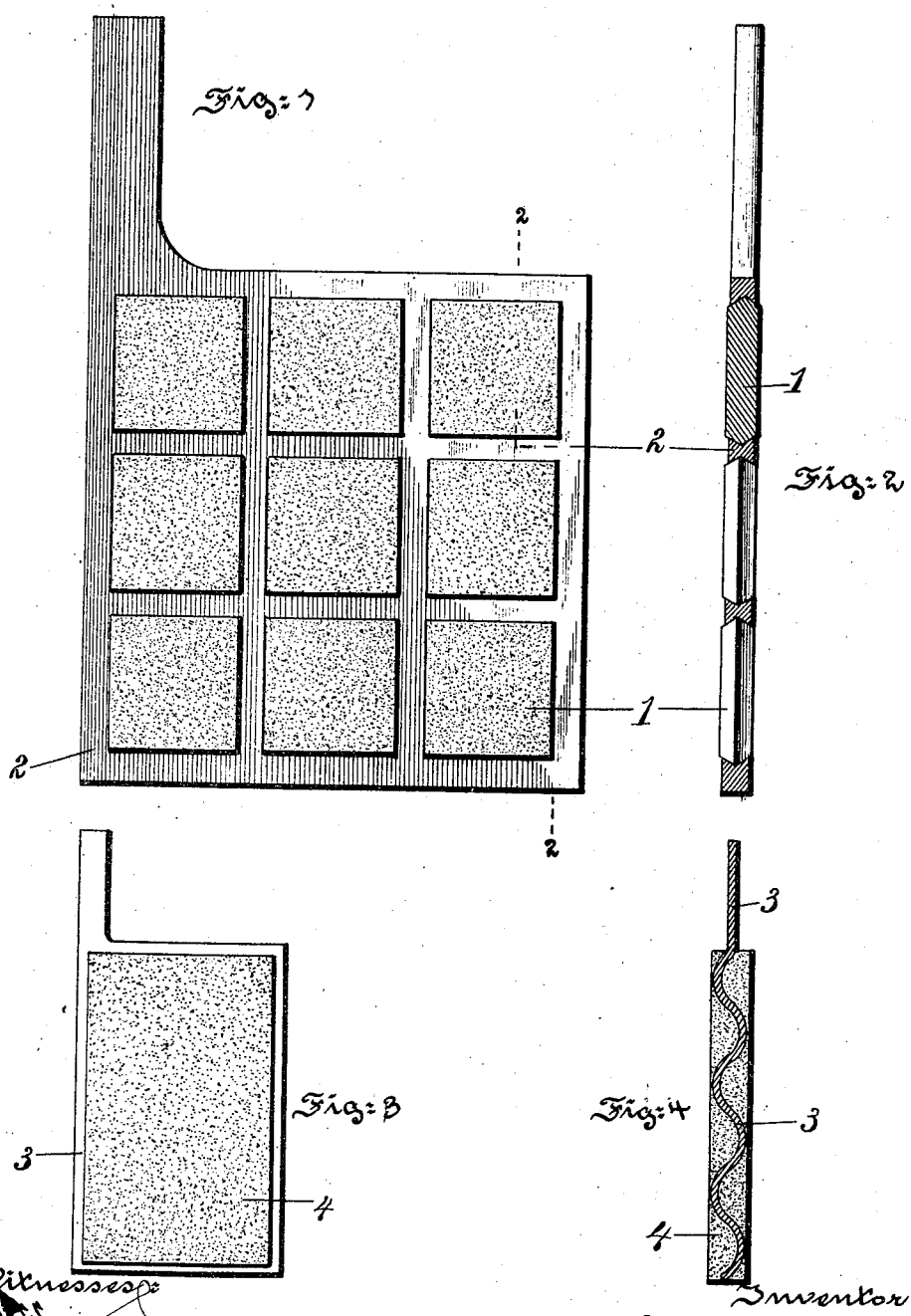

UNITED STATES PATENT OFFICE.

EDWARD G. STEINMETZ, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

SECONDARY BATTERY.

SPECIFICATION forming part of Letters Patent No. 704,767, dated July 15, 1902

Application filed September 29, 1900. Serial No. 31,593. (No model.)

*To all whom it may concern:*

Be it known that I, EDWARD G. STEINMETZ, a citizen of the United States, residing at Philadelphia, in the county of Philadelphia and State of Pennsylvania, have invented certain new and useful Improvements in Secondary Batteries, of which the following is a specification.

My invention has reference to secondary batteries, the plates of which are divided into what is hereinafter called the "support" or "grid" and a portion of finely-divided lead, hereinafter called the "active material" or material adapted to become active.

Objects of my invention are to provide lead in crystalline form for active material or material adapted to become active which will be integral throughout and free from blowholes or similar defects and to provide a process for obtaining lead in crystalline form without recourse to casting.

In obtaining crystalline lead for battery purposes it has been the practice heretofore to take a salt of lead, such as chlorid of lead, and after fusing casting it in a mold into solid blocks or forms. These were then put into a suitable framing-mold and a grid cast around them to form the plate. The plates were then put into a reducing-bath, as a solution of chlorid of zinc, and were connected to zinc plates, the metallic zinc being converted into chlorid of zinc at the expense of the chlorin in the chlorid of lead. This method gives the result of a very fine crystalline structure of the active mass; but casting presents disadvantages. It is considered prejudicial to the health of some of the workmen, it is slow, and the product is subject to the presence of blow-holes, which are often concealed, and therefore difficult to detect, and which give rise to blisters.

In carrying out my invention I impart crystalline structure by subjecting a mass or body of a lead oxid or salt or a mixture of salts or a mixture of a lead salt and lead oxid or other analogous lead compound to electrolytic action in a bath capable of dissolving it, the salt or oxid going into solution and immediately redepositing in a metallic state of crystalline structure without substantial change of external form of the mass. I may form the salt or oxid into blocks or cakes, and this I can do in several ways—for instance, by compressing the powdered or granulated chlorid between dies in a stamping-machine with sufficient pressure to make a solid block or by mixing with water or other suitable medium and molding it to shape and allowing it to set and harden like cement. These blocks I may then place in a mold, casting a grid around them in the usual way, and afterward reducing, as herein described. I have also found that I am able to obtain a plate whose active material is formed of finely-divided crystals by applying a suitable salt oxid or compound of lead, such as chlorid in the form of a paste, to the grid in a method well known in the art of storage-battery manufacture. The salt oxid or compound of lead so applied is converted into the crystalline state by the process herein described—i.e., by constituting it a cathode in an electrolytic bath in which said salt, oxid, or compound of lead is soluble. The product which I get is greatly superior to that obtained by the usual casting process, inasmuch as I do not have to take into consideration the item of shrinkage in the mold, and I am enabled to get buttons, blocks, or other products of absolute uniformity both in structure and shape with a freedom from blowholes, which are apt to occur in the casting process.

Referring to the drawings, Figure 1 is an elevation of a plate. Fig. 2 is a cross-section of the same on the line 2 2 of Fig. 1, and Figs. 3 and 4 are respectively an elevational and a sectional view showing a modification in which the salt oxid or other lead compound is mechanically applied to a support or its equivalent.

In the drawings, 1 is the active material, (or material to become active,) and in Figs. 1 and 2 it is shown in position after the frame or grid 2 has been cast around it.

In Figs. 3 and 4, 3 is a grid made by casting lead or antimonious lead or any similar material used for this purpose, or it may be made by punching or rolling into shape or by any other method, this feature not being part of the invention. The active material 4, or material adapted to become active, is applied to this grid in the form of a paste and can be made by mixing chlorid of lead or a similar salt with water or other medium and then reducing it to the condition of lead in crystalline form, as described.

I am aware that it has been the practice in the art of the manufacture of secondary-battery plates to apply an oxid of lead in the form of a paste to the grid and afterward reduce this to sponge-lead by electrolytic action in dilute sulfuric acid; but the lead thus formed is not of a crystalline nature, but merely a sponge or a mass of porous lead. By subjecting a salt oxid or other compound of lead, such as chlorid of lead, to electrolytic action in a solution in which it is soluble I am enabled to produce lead free from blow-holes and in the form of finely-divided crystals. My belief is that in the reduction of this lead compound the latter goes into solution and is immediately redeposited in a metallic state in the form of crystals, whereas in the old method the metallic lead was produced in an amorphous spongy form directly from the solid oxid without going into solution.

While I refer to the use of chlorid of lead in the manner herein described, reducing it in a bath of chlorid-of-zinc solution of 52° Baumé, more or less, by electrically connecting it with a zinc plate, also immersed in the solution, or by current otherwise obtained, nevertheless I do not limit myself thereto, as there are other salts which are soluble or partially soluble in other electrolytes which would give in reduction the same crystalline structure—for example, acetate of lead could be reduced in an electrolyte of acetate-of-zinc solution and give a similar result, or I can use an oxid of lead, such as litharge, which is insoluble in ordinary electrolytes; but by reducing it in an electrolyte of ammonium-acetate solution in which it is soluble or partially soluble I can obtain a crystalline structure.

What I claim as new, and desire to secure by Letters Patent, is—

1. Active material or material to become active consisting of a coherent mass of crystalline lead free from blow-holes, the crystals of said mass being interrelated according to their law of crystallization, substantially as described.

2. The process of producing active material or material to become active which consists in making an amorphous body of lead compound, and subjecting the compound as a cathode to electrolytic action in a bath in which the compound is soluble, thereby changing its structure into the form of a coherent crystalline mass, substantially as described.

3. The process of producing active material or material to become active which consists in making an amorphous body of chlorid of lead, and subjecting the body as a cathode to electrolytic action in a bath in which the chlorid of lead is soluble, thereby changing its structure into the form of a coherent crystalline mass, substantially as described.

In testimony whereof I have hereunto signed my name.

EDWARD G. STEINMETZ.

In presence of—
W. J. JACKSON,
K. M. GILLIGAN.